United States Patent
Gutman et al.

(10) Patent No.: US 11,589,363 B2
(45) Date of Patent: Feb. 21, 2023

(54) INDICATING A SIGNAL TO NOISE RATIO FOR DOWNLINK COMMUNICATION

(71) Applicant: QUALCOMM Incorporated, San Diego, CA (US)

(72) Inventors: Igor Gutman, Ramat Gan (IL); Ronen Greenberger, Modiin (IL); Yossi Waldman, Olesh (IL); Oren Matsrafi, Karkur (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/154,754

(22) Filed: Jan. 21, 2021

(65) Prior Publication Data
US 2021/0235462 A1 Jul. 29, 2021

Related U.S. Application Data

(60) Provisional application No. 62/965,585, filed on Jan. 24, 2020.

(51) Int. Cl.
*H04W 4/00* (2018.01)
*H04W 72/08* (2009.01)
*H04W 72/04* (2023.01)
*H04W 72/0446* (2023.01)

(52) U.S. Cl.
CPC ....... *H04W 72/082* (2013.01); *H04W 72/042* (2013.01); *H04W 72/0446* (2013.01)

(58) Field of Classification Search
CPC ............. H04W 72/082; H04W 72/042; H04W 72/0446
See application file for complete search history.

(56) References Cited

U.S. PATENT DOCUMENTS

| | | | |
|---|---|---|---|
| 10,939,458 B2 * | 3/2021 | Kim | H04L 5/0082 |
| 11,387,933 B2 | 7/2022 | Gutman et al. | |
| 2007/0149128 A1 * | 6/2007 | Das | H04W 72/0413 455/67.11 |
| 2015/0092681 A1 * | 4/2015 | Fernando | H04W 72/085 370/329 |
| 2018/0323902 A1 * | 11/2018 | Rico Alvarino | H04L 1/0004 |
| 2019/0238257 A1 | 8/2019 | Hosseini et al. | |
| 2021/0211981 A1 | 7/2021 | Greenberger et al. | |

FOREIGN PATENT DOCUMENTS

WO WO-2015114544 A1 8/2015

OTHER PUBLICATIONS

International Search Report and Written Opinion—PCT/US2021/014698—ISA/EPO—dated Apr. 23, 2021.

\* cited by examiner

*Primary Examiner* — Abdelnabi O Musa
(74) *Attorney, Agent, or Firm* — Harrity & Harrity, LLP (57) ABSTRACT

Various aspects of the present disclosure generally relate to wireless communication. In some aspects, a user equipment (UE) may receive, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof; and operate using the SNR mode in the one or more slots based at least in part on the indication. Numerous other aspects are provided.

30 Claims, 7 Drawing Sheets

INDICATING A SIGNAL TO NOISE RATIO FOR DOWNLINK COMMUNICATION

CROSS-REFERENCE TO RELATED APPLICATION

This Patent Application claims priority to U.S. Provisional Patent Application No. 62/965,585, filed on Jan. 24, 2020, entitled "INDICATING A SIGNAL TO NOISE RATIO FOR DOWNLINK COMMUNICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating a signal to noise ratio for downlink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof; and operating using the SNR mode in the one or more slots based at least in part on the indication.

In some aspects, a method of wireless communication, performed by a base station, may include determining a modulation and coding scheme (MCS) and a rank to be used for one or more downlink communications in one or more slots; determining a SNR mode, of a plurality of SNR modes, to be indicated to a UE for the one or more downlink communications in the one or more slots based at least in part on at least one of the MCS, the rank, or a combination thereof; and transmitting, to the UE, an indication of the SNR mode.

In some aspects, a UE for wireless communication may include a memory and one or more processors operatively coupled to the memory. The memory and the one or more processors may be configured to receive, from a base station and in a first slot, an indication of a SNR mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof; and operate using the SNR mode in the one or more slots based at least in part on the indication.

In some aspects, a base station for wireless communication may include a memory and one or more processors operatively coupled to the memory. The memory and the one or more processors may be configured to determine an MCS and a rank to be used for one or more downlink communications in one or more slots; determine a SNR mode, of a plurality of SNR modes, to be indicated to a UE for the one or more downlink communications in the one or more slots based at least in part on at least one of the MCS, the rank, or a combination thereof; and transmit, to the UE, an indication of the SNR mode.

In some aspects, a non-transitory computer-readable medium may store one or more instructions for wireless communication. The one or more instructions, when executed by one or more processors of a UE, may cause the one or more processors to receive, from a base station and in a first slot, an indication of a SNR mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof; and operate using the SNR mode in the one or more slots based at least in part on the indication.

In some aspects, a non-transitory computer-readable medium may store one or more instructions for wireless communication. The one or more instructions, when executed by one or more processors of a base station, may cause the one or more processors to determine an MCS and a rank to be used for one or more downlink communications in one or more slots; determine a SNR mode, of a plurality of SNR modes, to be indicated to a UE for the one or more downlink communications in the one or more slots based at least in part on at least one of the MCS, the rank, or a combination thereof; and transmit, to the UE, an indication of the SNR mode.

In some aspects, an apparatus for wireless communication may include means for receiving, from a base station and in a first slot, an indication of a SNR mode, of a plurality of SNR modes, to be used by the apparatus for one or more downlink communications in one or more slots that occur after the first slot, wherein different SNR modes of the plurality of SNR modes support at least one of different modulation and coding schemes, different ranks, or a combination thereof; and means for operating using the SNR mode in the one or more slots based at least in part on the indication.

In some aspects, an apparatus for wireless communication may include means for determining an MCS and a rank to be used for one or more downlink communications in one or more slots; means for determining a SNR mode, of a plurality of SNR modes, to be indicated to a UE for the one or more downlink communications in the one or more slots based at least in part on at least one of the MCS, the rank, or a combination thereof; and means for transmitting, to the UE, an indication of the SNR mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
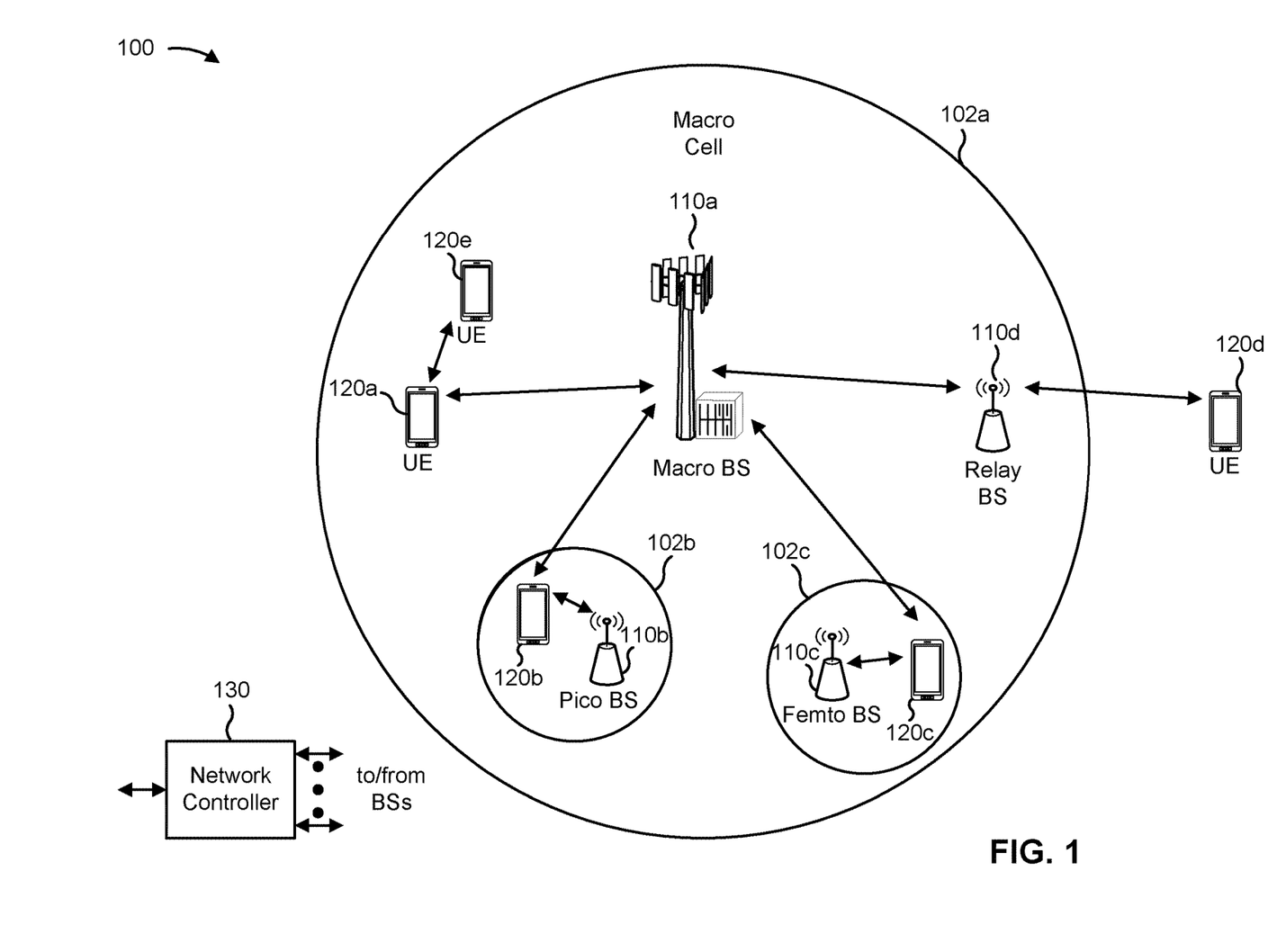
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
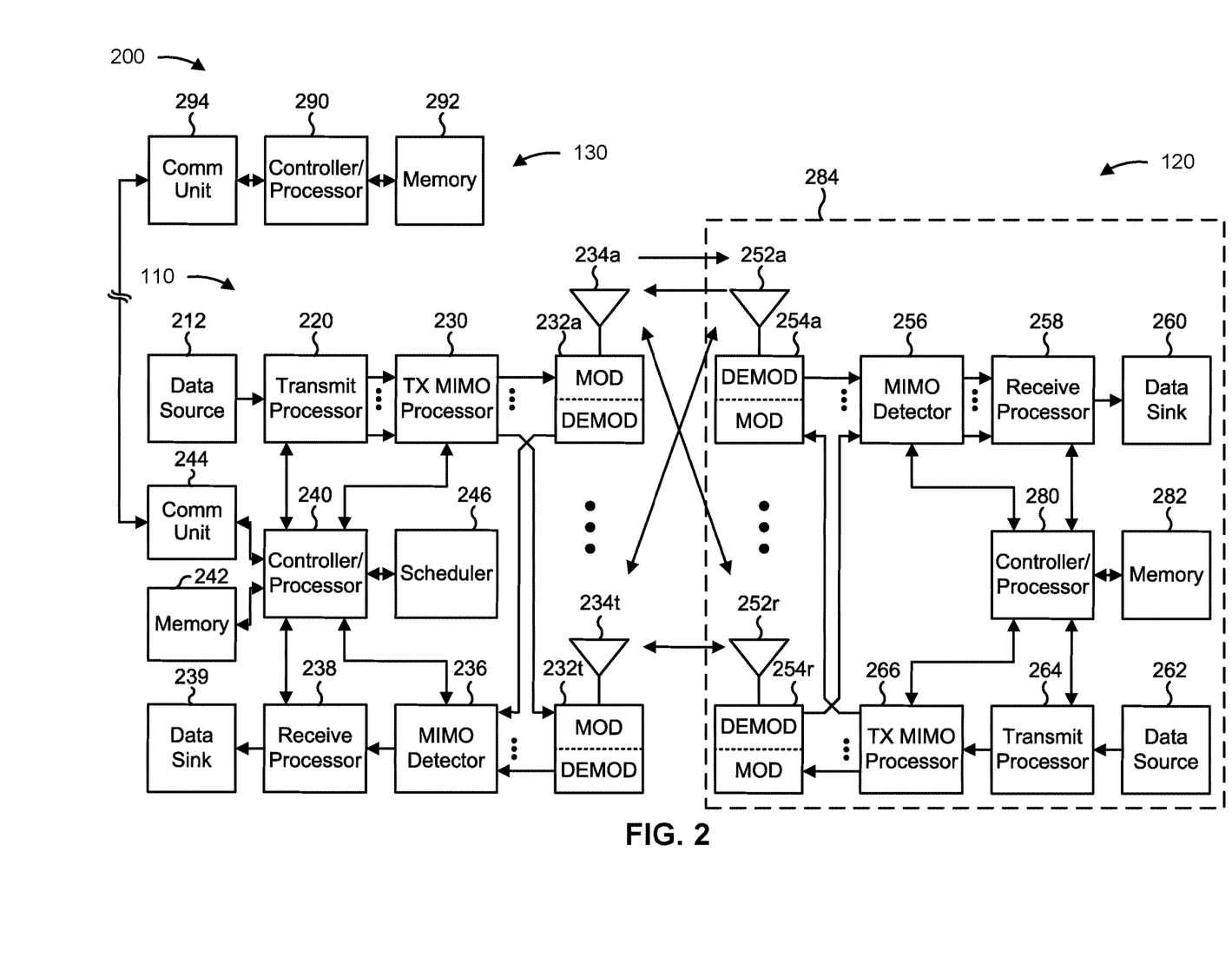
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-7.

Controller/processor 240 of base station 110, controller/processor 280 of UE 120, and/or any other component(s) of FIG. 2 may perform one or more techniques associated with indicating a signal to noise ratio (SNR) for downlink communication, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof, means for operating using the SNR mode in the one or more slots based at least in part on the indication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a modulation and coding scheme (MCS) and a rank to be used for one or more downlink communications in one or more slots, means for determining a signal to noise ratio (SNR) mode, of a plurality of SNR modes, to be indicated to a user equipment (UE) for the one or more downlink communications in the one or more slots based at least in part on at least one of the MCS, the rank, or a combination thereof, means for transmitting, to the UE, an indication of the SNR mode, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
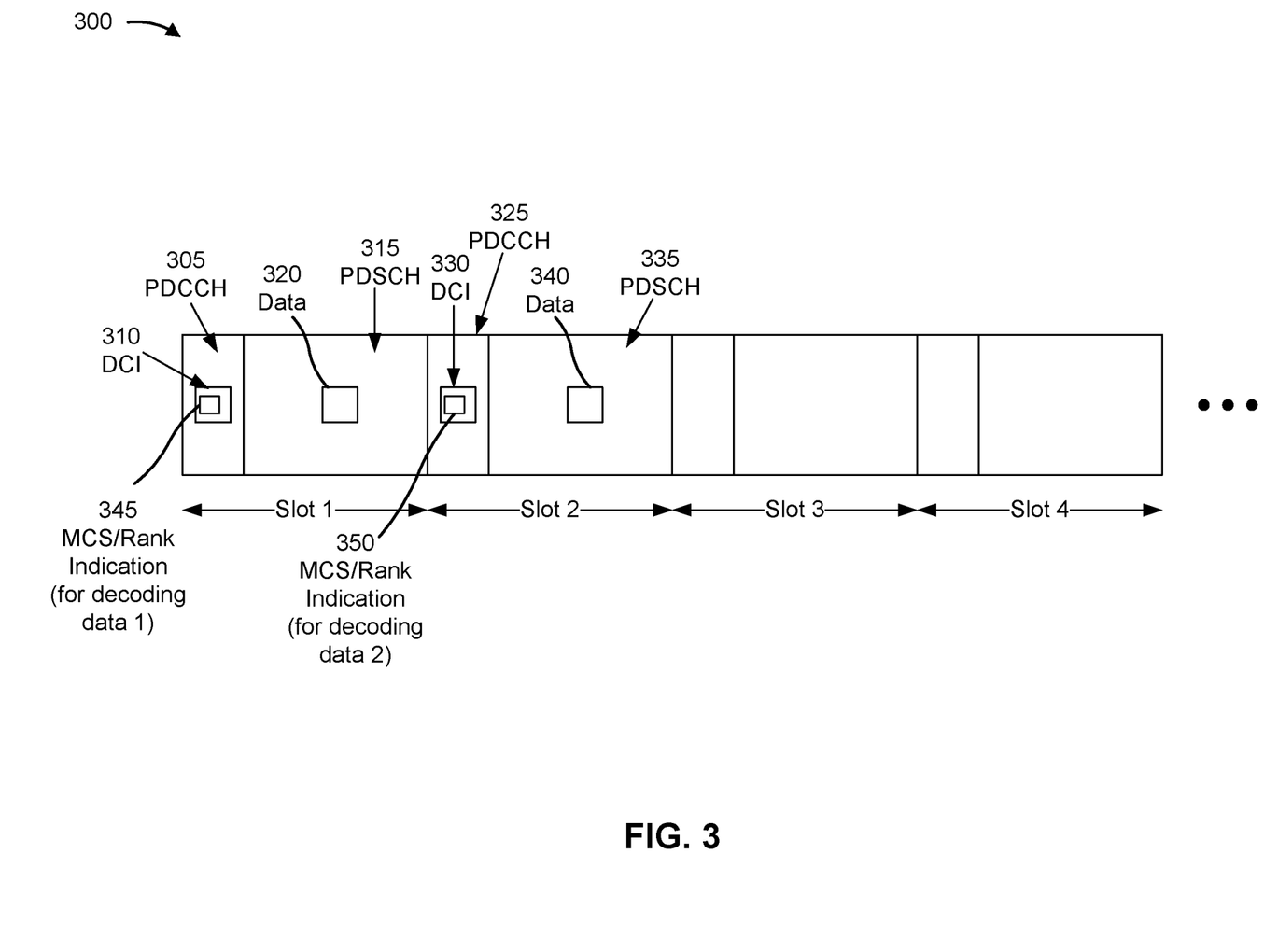
FIG. 3 is a diagram illustrating an example of a downlink communication, in accordance with the present disclosure.

FIG. 3 is a diagram illustrating an example 300 of a downlink communication, in accordance with the present disclosure.

As shown in FIG. 3, a time domain component of a downlink communication may include a number of consecutive slots (shown as "slot 1," "slot 2," "slot 3," and "slot 4"). Each slot may include a physical downlink control channel (PDCCH) for transmitting control information and a physical downlink shared channel (PDSCH) for transmitting data. For example, as shown, slot 1 may include a first PDCCH 305 carrying downlink control information (DCI) 310 and a first PDSCH 315 carrying data 320. Slot 2 may include a second PDCCH 325 carrying DCI 330 and a second PDSCH 335 carrying data 340. Slot 3, slot 4, and/or the like, may be similarly configured. The DCI 310 may schedule the transmission of the data 320 in the first PDSCH 315, and may include an indication 345 of a modulation and coding scheme (MCS), a MIMO rank, and/or the like, corresponding to the first PDSCH 315. Similarly, the DCI 330 may schedule the transmission of the data 340 in the second PDSCH 335, and may include an indication 350 of an MCS, a MIMO rank, and/or the like, corresponding to the second PDSCH 335.

A UE may be configured with hardware components and/or software processes that support enhanced communications capabilities, such as greater sampling rates and greater numbers of component carriers. For example, the UE 120 may include hardware components of a receive chain and be configured with processes that support downlink communications in portions of the radio frequency spectrum exceeding several GHz (e.g., millimeter wave (mmW) transmissions in 5G or NR, which may be communicated at a frequency of 28 GHz or higher), with a relatively high degree of accuracy and granularity.

Although the power consumption per bit in mmW cellular is smaller than that of 5G-NR SUB6 or LTE, the bandwidths in mmW deployments may be approximately 5 to 10 times larger than those of 5G-NR SUB6 or LTE, and therefore the total power consumption may be significantly larger. In a typical mmW 5G-NR case, the modulation and coding scheme (MCS) and rank combination is the same for all carrier waves in a slot. The first one or more symbols may contain only physical downlink control channel (PDCCH) transmissions. The required SNR for decoding PDCCH is low (e.g., less than 20 dB), as is the required SNR for decoding nearly 90% of communications, since the UE 120 is in the cell edge in many cases. However, to decode some downlink communications, SNRs of up to 35 dB may be required. This high SNR operation may be achieved using power-intensive hardware.

To facilitate power savings, the UE 120 may be configured to operate in two or more different SNR modes, in which different hardware configurations are used for decoding data based at least in part on the required SNR for decoding the data, which is based at least in part on an associated MCS and/or rank. As indicated above, the MCS and rank information (from which SNR requirements can be determined) for each slot is contained in the DCI of that slot.

Thus, an adaptive solution in which a UE 120 switches to a different SNR mode based on information about the slot is not useful, as changing the SNR mode requires activating or deactivating hardware components, which takes time. For example, if the UE 120 determines an appropriate SNR mode based on the indication 345 associated with the data 320, the UE 120 will have already started (and maybe completed) decoding the data 320 before the UE 120 has completely transitioned to the appropriate SNR mode. Moreover, switching to a different SNR mode in the middle of the slot may be risky due to long transition effects that may add non-linear performance degradation.

According to various aspects described herein, a BS 110 may provide an indication of an SNR mode to be used for downlink communications in one or more slots after a current slot, thereby giving the UE 120 time to activate an appropriate SNR mode, thereby enabling power savings where appropriate (e.g., using lower SNR modes), and preserving communication efficiency by selectively enabling higher SNR modes, which facilitate more accurate decoding. Some aspects of the signaling for indicating SNR mode described herein may enable these power savings without increasing transmission overhead.

As indicated above, FIG. 3 is provided as an example. Other examples may differ from what is described with regard to FIG. 3.

Figure 4:
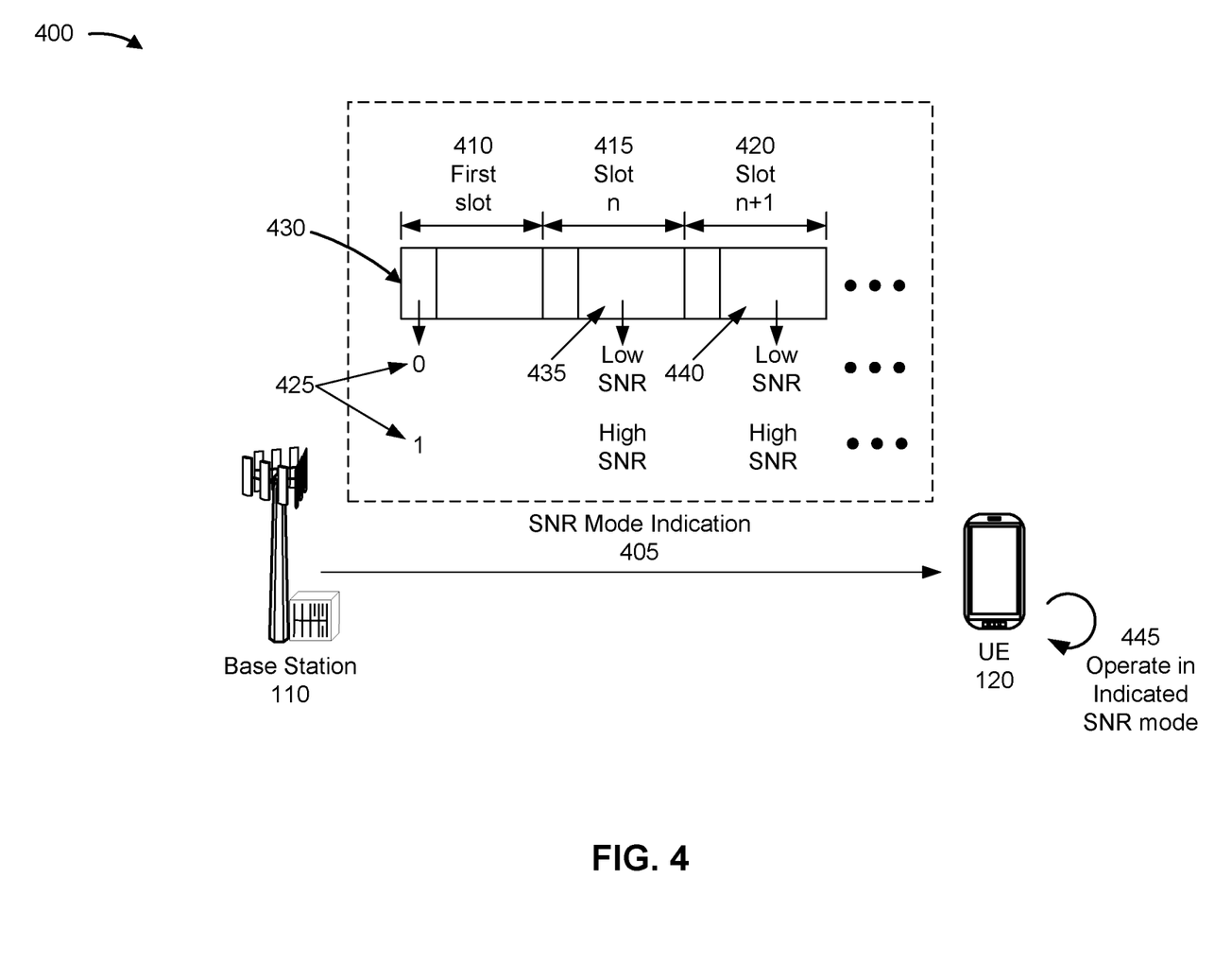
FIGS. 4 and 5 are diagrams illustrating examples of indicating a signal to noise ratio for downlink communication, in accordance with the present disclosure.

FIG. 4 is a diagram illustrating an example 400 of indicating an SNR for downlink communication, in accordance with the present disclosure. As shown in FIG. 4, a BS 110 and a UE 120 may communicate with one another.

As shown by reference number 405, the BS 110 may transmit, and the UE 120 may receive, an indication of an SNR mode of a plurality of SNR modes. The indication may be transmitted in a first slot 410 and may indicate the SNR mode to be used by the UE 120 for one or more downlink communications in one or more slots (e.g., slot n 415, slot n+1 420, and/or the like) that occur after the first slot 410. In this way, the UE 120 may have time to transition to the indicated SNR mode before decoding the communication to which the SNR mode applies.

The SNR mode may include an operating mode that the UE 120 uses in decoding a transmission. An indication of an SNR mode may indicate a specified SNR, a specified range of SNR, and/or the like, to be used for decoding downlink communications. In this way, different SNR modes of the plurality of SNR modes support at least one of different MCSs, different ranks, and/or the like. The BS 110 may determine an MCS and a rank to be used for one or more downlink communications in one or more slots (e.g., slot n 415, slot n+1 420, and/or the like) and determine the SNR mode based at least in part on at least one of the MCS, the rank, or a combination thereof.

In some aspects, the plurality of SNR modes may include two SNR modes—a low SNR mode and a high SNR mode. For example, a low SNR mode may correspond to less than 10 decibels (dB) and a high SNR mode may correspond to greater than 10 dB. In some aspects, the plurality of SNR modes may include three or more SNR modes, each corresponding to an SNR range. For example, the plurality of SNR modes may include four SNR modes. A first SNR mode may correspond to a range of 0-10 dB, a second SNR mode may correspond to a range of 11-20 dB, a third SNR mode may correspond to a range of 21-30 dB, and a fourth SNR mode may correspond to greater than 31 dB. In some aspects, any number of different SNR modes may be used, depending on the hardware capabilities of the UE 120.

In some aspects, as shown in FIG. 4, the indication of the SNR mode to be used by the UE 120 is included in downlink control information (DCI) 430. For example, as shown, the indication of the SNR mode may include a single bit 425 in the DCI 430 of the first slot 410. The bit 425 may indicate a first SNR mode (e.g., by using a value of "0") or a second SNR mode (e.g., by using a value of "1"). The indicated SNR mode may correspond to downlink communications 435 in slot n 415, downlink communications 440 in slot n+1 420, and/or the like.

In some aspects, the indication of the SNR mode to be used by the UE 120 for the one or more downlink communications in the one or more slots may include multiple bits in the DCI 430 that indicates the SNR mode from more than two SNR modes. The indication of the SNR mode may include a specific field pattern of the DCI 430. For example, the SNR mode may be indicated using a PDCCH order that includes a specified field pattern of a DCI Format 1_0. In some aspects, the indication of the SNR mode may indicate the one or more slots for which the SNR mode is to be used.

In some aspects, the indication of the SNR mode may include an indication that the SNR mode is a higher SNR mode than an SNR mode that is active for the UE 120 in the first slot 410. That is, for example, the BS 110 may transmit an indication that an upcoming slot or slots (e.g., slot n 415, slot n+1 420, and/or the like) may require a higher SNR mode than the first slot 410 requires. The higher SNR mode may be indicated based at least in part on DCI 430 including a slot offset parameter, $K_0$, with a value that satisfies a threshold (e.g., $K_0>0$). The slot offset parameter, $K_0$, may indicate an amount of time between the DCI 430 and a communication (e.g., the downlink communication 435, the downlink communication 440, and/or the like) scheduled by the DCI 430. The communication scheduled by the DCI 430 may be transmitted via PDSCH, power control subchannel (PCSCH), and/or the like.

As shown by reference number 445, the UE 120 may operate using the indicated SNR mode in the one or more slots (e.g., slot n 415, slot n+1 420, and/or the like) based at least in part on the indication. The UE 120 may be configured to operate in the SNR mode until a new indication of a different SNR mode is received, for a duration (e.g., number of slots) specified by the indication, and/or the like.

In some aspects, a low SNR mode may refer to an operating mode in which any number of power optimizations may be applied. The power optimizations may include, for example, reducing an effective number of bits that an analog-to-digital converter (ADC) may use, corresponding to an effective resolution of the ADC, and/or reducing a number of bits used through the overall receive chain (e.g., ignoring or "zeroing out" one or more least significant bits (LSBs) of a received number of bits per data packet). In some aspects, power optimizations may include deactivating or modifying operation of a synthesizer (e.g., reducing an amount of power to the synthesizer, or effectively turning off the synthesizer), reduce the power driving a low-noise amplifier (LNA), reduce a power to a signal from an oscillator to be combined with a received signal at a mixer, and/or other like operations that may introduce additional phase and/or thermal noise into the received signal. In some aspects, power optimizations may include reducing an amount of power to an anti-aliasing filter, which may, for example, deactivate or diminish the function of one more of the filtering elements of the anti-aliasing filter. In some aspects, the power optimizations may include using a linear minimum mean square error (LMMSE) mapper instead of a maximum likelihood (ML) mapper, using a 2D linear interpolation channel estimation (chEst: 1), and/or the like.

Some aspects of the SNR indication techniques described above may enable a UE 120 to activate a low SNR mode when a lower SNR is required for decoding transmissions, thereby facilitating power savings. Some aspects of the SNR indication techniques described above also enable a BS 110 to provide an indication of an SNR mode for upcoming slots so that the UE 120 may have time to transition to the indicated SNR mode before decoding the communications in the slots. Some aspects of the signaling for indicating SNR mode described herein may enable these power savings without increasing transmission overhead. A number of different SNR modes may be used to increase the efficiency of operations by enabling a more granular correlation between SNR mode and MCS and/or rank.

As indicated above, FIG. 4 is provided as an example. Other examples may differ from what is described with regard to FIG. 4.

Figure 5:
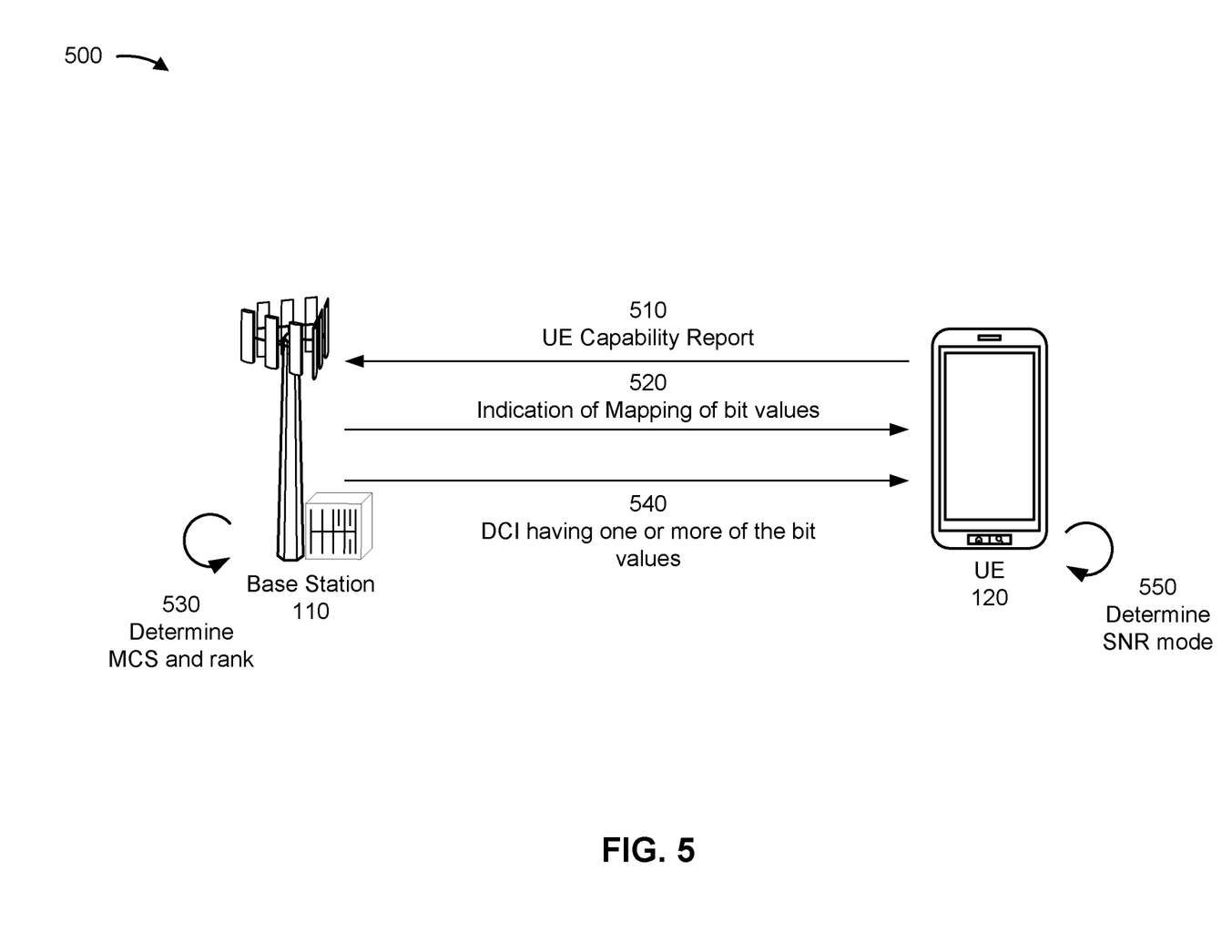

FIG. 5 is a diagram illustrating another example 500 of indicating an SNR for downlink communication, in accordance with the present disclosure. As shown in FIG. 5, a BS 110 and a UE 120 may communicate with one another.

As shown by reference number 510, the UE 120 may transmit, and the BS 110 may receive, a UE capability report that may include an indication that the UE 120 supports an SNR mode. In some aspects, the UE capability report may indicate one or more additional SNR modes, of the plurality of SNR modes, that the UE 120 supports. The UE capability report may indicate a number of bits that the BS 110 is to use to indicate the SNR mode. In some aspects, the number of bits that the BS 110 is to use to indicate the SNR mode may be indicated (and/or determined by the BS 110) based at least in part on a number of supported SNR modes indicated in the UE capability report.

As shown by reference number 520, the BS 110 may transmit, and the UE 120 may receive, an indication of a mapping between a set of bit values, for one or more bits used to indicate the SNR mode, and at least one of a corresponding set of SNR modes, a corresponding set of MCSs, a corresponding set of ranks, a corresponding set of combinations of MCSs and ranks, or a combination thereof. The indication of the mapping may be transmitted in a radio resource control (RRC) communication. In some aspects, the mapping may be specified according to a wireless communication standard.

As shown by reference number 530, the BS 110 may determine an MCS and a rank to be used for one or more downlink communications in one or more slots. In some aspects, the BS 110 may determine an SNR mode, of a plurality of SNR modes, to be indicated to the UE 120 for the one or more downlink communications in the one or more slots. The SNR mode may be determined based at least in part on at least one of the MCS, the rank, or a combination thereof.

As shown by reference number 540, the BS 110 may transmit, and the UE 120 may receive, DCI having one or more bit values of the set of bit values. The one or more bit values may indicate the SNR mode to be used by the UE 120 for the one or more downlink communications in the one or more slots. As shown by reference number 550, the UE 120 may determine the SNR mode to be used based at least in part on the one or more bit values and the indication of the mapping of the bit values received from the BS 110.

In this way, some aspects of the SNR indication techniques described above may enable a UE 120 to negotiate indication signaling with a BS 110 so that the BS 110 can provide an indication to the UE 120 to activate an appropriate SNR mode for upcoming downlink communications, thereby facilitating power savings. Some aspects of the signaling for indicating SNR mode described above may enable these power savings without increasing transmission overhead, e.g., by using a PDCCH field pattern, which does not require the addition of any bits to the DCI.

As indicated above, FIG. 5 is provided as an example. Other examples may differ from what is described with regard to FIG. 5.

Figure 6:
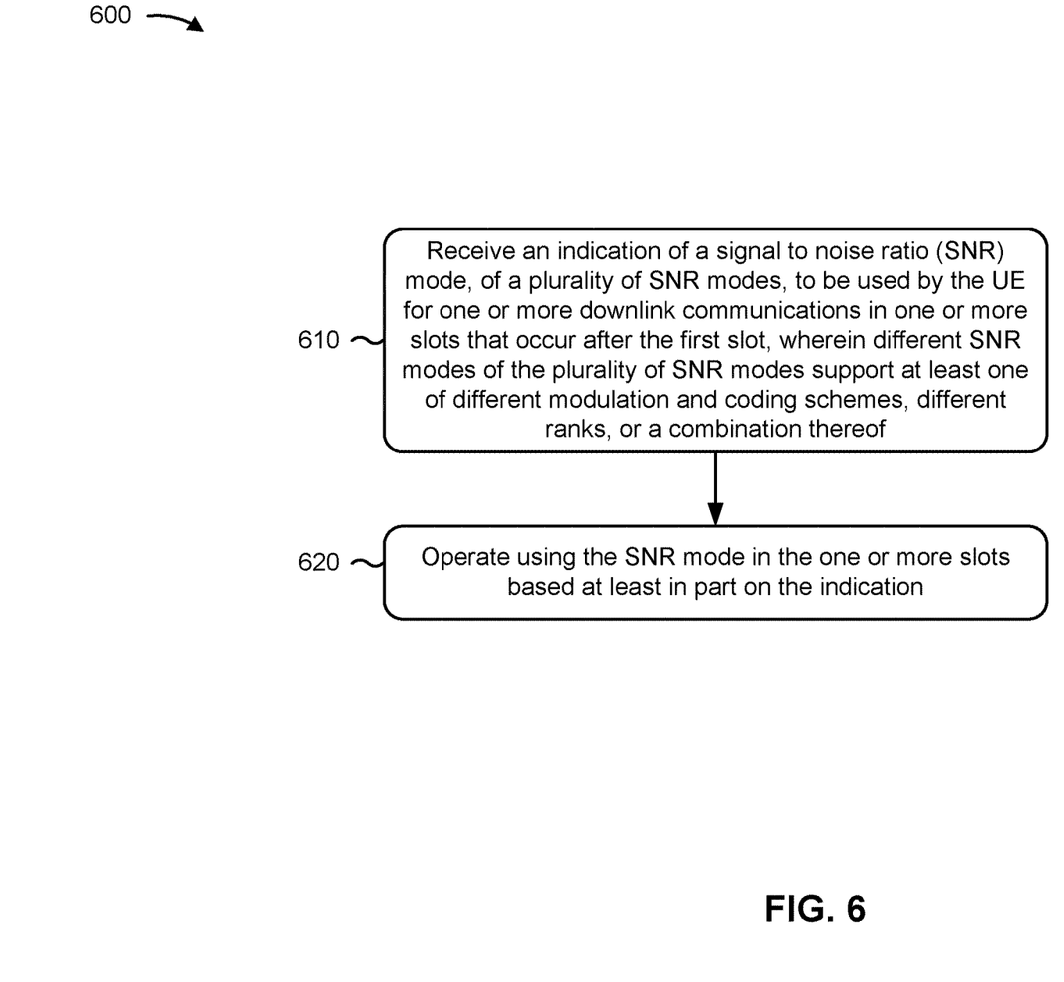
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with indicating a signal to noise ratio for downlink communication.

As shown in FIG. 6, in some aspects, process 600 may include receiving, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof (block 610). For example, the UE (e.g., using receive processor 258, controller/processor 280, memory 282, and/or the like) may receive, from a base station and in a first slot, an indication of a signal to noise ratio (SNR) mode, of a plurality of SNR modes, to be used by the UE for one or more downlink communications in one or more slots that occur after the first slot, as described above. In some aspects, different SNR modes of the plurality of SNR modes support at least one of different modulation and coding schemes, different ranks, or a combination thereof.

As further shown in FIG. 6, in some aspects, process 600 may include operating using the SNR mode in the one or more slots based at least in part on the indication (block 620). For example, the UE (e.g., using receive processor 258, transmit processor 264, controller/processor 280, memory 282, and/or the like) may operate using the SNR mode in the one or more slots based at least in part on the indication, as described above.

Process 600 may include additional aspects, such as any single aspect or any combination of aspects described below and/or in connection with one or more other processes described elsewhere herein.

In a first aspect, process 600 includes transmitting, to the base station, a UE capability report that includes an indication that the UE supports the SNR mode.

In a second aspect, alone or in combination with the first aspect, the UE capability report indicates one or more additional SNR modes, of the plurality of SNR modes, that the UE supports.

In a third aspect, alone or in combination with one or more of the first and second aspects, the UE capability report indicates a number of bits that the base station is to use to indicate the SNR mode.

In a fourth aspect, alone or in combination with one or more of the first through third aspects, process 600 includes receiving, from the base station, an indication of a mapping between a set of bit values, for one or more bits used to indicate the SNR mode, and at least one of: a corresponding is setting of SNR modes, a corresponding is setting of modulation and coding schemes, a corresponding is setting of ranks, a corresponding is setting of combinations of modulation and coding scheme and rank, or a combination thereof.

In a fifth aspect, alone or in combination with the fourth aspect, the indication of the SNR mode to be used by the UE for the one or more downlink communications in the one or more slots comprises one or more bit values of the set of bit values.

In a sixth aspect, alone or in combination with one or more of the first through fifth aspects, the indication of the SNR mode to be used by the UE for the one or more downlink communications in the one or more slots is included in downlink control information (DCI).

In a seventh aspect, alone or in combination with the sixth aspect, the indication of the SNR mode to be used by the UE for the one or more downlink communications in the one or more slots is a single bit in the DCI that indicates a first SNR mode or a second SNR mode.

In an eighth aspect, alone or in combination with the sixth aspect, the indication of the SNR mode to be used by the UE for the one or more downlink communications in the one or more slots includes multiple bits in the DCI that indicates the SNR mode from more than two SNR modes.

In a ninth aspect, alone or in combination with one or more of the sixth or eighth aspects, the indication of the SNR mode to be used by the UE for the one or more downlink communications in the one or more slots comprises a specific field pattern of the DCI.

In a tenth aspect, alone or in combination with one or more of the first through ninth aspects, the indication of the SNR mode to be used by the UE for the one or more downlink communications in the one or more slots indicates the one or more slots.

In an eleventh aspect, alone or in combination with one or more of the first through tenth aspects, the indication of the SNR mode to be used by the UE for the one or more downlink communications in the one or more slots comprises an indication that the SNR mode is a higher SNR mode than an SNR mode that is active for the UE in the first slot.

In a twelfth aspect, alone or in combination with the eleventh aspect, the higher SNR mode is indicated based at least in part on downlink control information (DCI) including a slot offset parameter with a value greater than a threshold, the slot offset parameter indicates an amount of time between the DCI and a communication scheduled by the DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
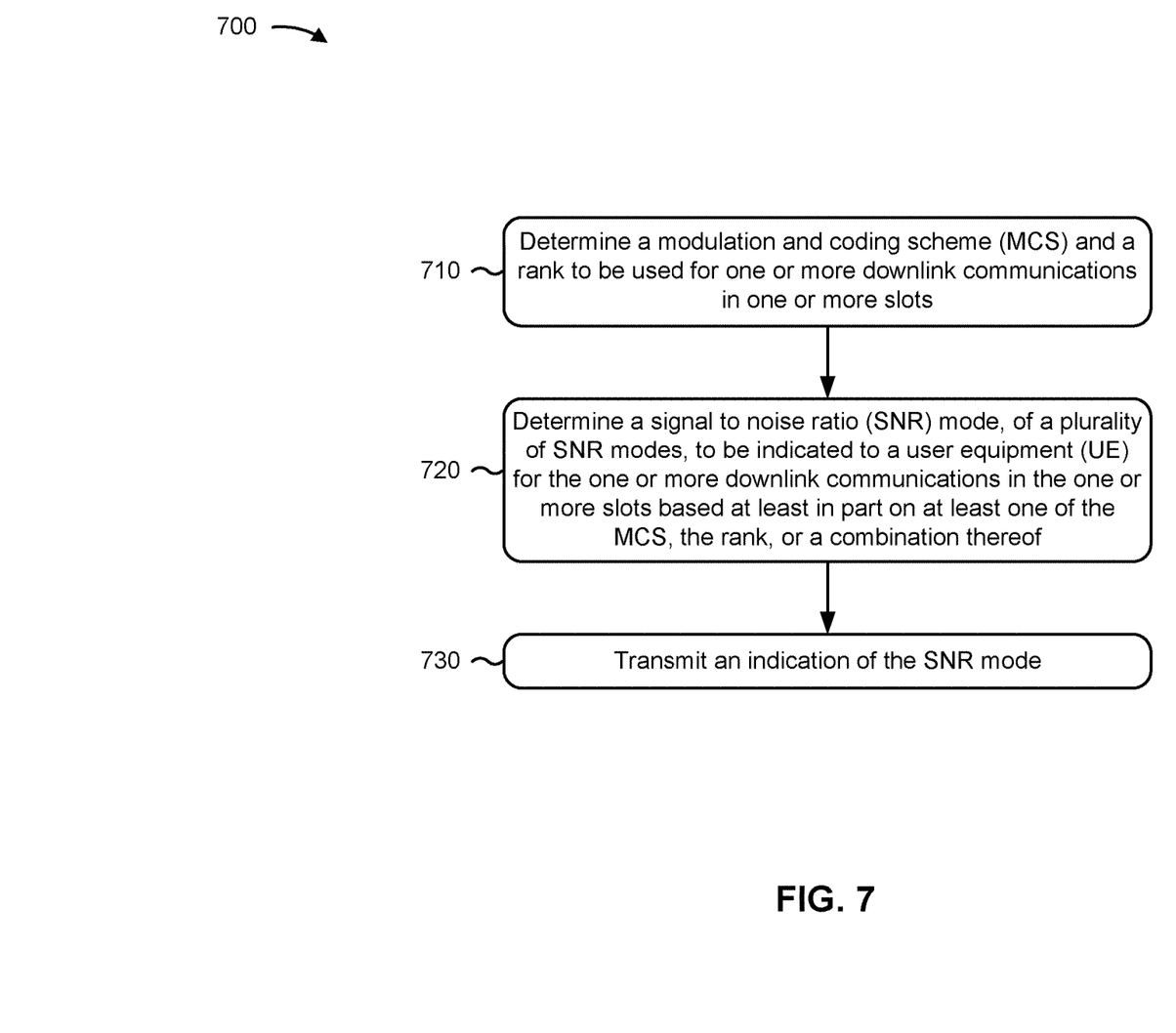
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with indicating a signal to noise ratio for downlink communication.

As shown in FIG. 7, in some aspects, process 700 may include determining a modulation and coding scheme (MCS) and a rank to be used for one or more downlink communications in one or more slots (block 710). For example, the base station (e.g., using transmit processor 220, receive processor 238, controller/processor 240, memory 242, and/or the like) may determine a modulation and coding scheme (MCS) and a rank to be used for one or more downlink communications in one or more slots, as described above.

As further shown in FIG. 7, in some aspects, process 700 may include determining a signal to noise ratio (SNR) mode, of a plurality of SNR modes, to be indicated to a UE for the one or more downlink communications in the one or more slots based at least in part on at least one of the MCS, the rank, or a combination thereof (block 720). For example, the base station (e.g., using transmit processor 220, receive processor 238, controller/processor 240, memory 242, and/or the like) may determine a signal to noise ratio (SNR) mode, of a plurality of SNR modes, to be indicated to a UE for the one or more downlink communications in the one or more slots based at least in part on at least one of the MCS, the rank, or a combination thereof, as described above.

As further shown in FIG. 7, in some aspects, process 700 may include transmitting, to the UE, an indication of the SNR mode (block 730). For example, the base station (e.g., using transmit processor 220, controller/processor 240, memory 242, and/or the like) may transmit, to the UE, an indication of the SNR mode, as described above.

Process 700 may include additional aspects, such as any single aspect or any combination of aspects described below and/or in connection with one or more other processes described elsewhere herein.

In a first aspect, process 700 includes receiving, from the UE, a UE capability report that includes an indication that the UE supports the SNR mode.

In a second aspect, alone or in combination with the first aspect, the UE capability report indicates one or more additional SNR modes, of the plurality of SNR modes, that the UE supports.

In a third aspect, alone or in combination with one or more of the first and second aspects, the UE capability report indicates a number of bits that the base station is to use to indicate the SNR mode.

In a fourth aspect, alone or in combination with one or more of the first through third aspects, process 700 includes transmitting, to the UE, an indication of a mapping between a set of bit values, for one or more bits used to indicate the SNR mode, and at least one of: a corresponding is setting of SNR modes, a corresponding is setting of modulation and coding schemes, a corresponding is setting of ranks, a corresponding is setting of combinations of modulation and coding scheme and rank, or a combination thereof.

In a fifth aspect, alone or in combination with the fourth aspect, the indication of the SNR mode to be used by the UE for the one or more downlink communications in the one or more slots comprises one or more bit values of the set of bit values.

In a sixth aspect, alone or in combination with one or more of the first through fifth aspects, the indication of the SNR mode to be used by the UE for the one or more downlink communications in the one or more slots is included in downlink control information (DCI).

In a seventh aspect, alone or in combination with the sixth aspect, the indication of the SNR mode to be used by the UE for the one or more downlink communications in the one or more slots is a single bit in the DCI that indicates a first SNR mode or a second SNR mode.

In an eighth aspect, alone or in combination with the sixth aspect, the indication of the SNR mode to be used by the UE for the one or more downlink communications in the one or more slots includes multiple bits in the DCI that indicates the SNR mode from more than two SNR modes.

In a ninth aspect, alone or in combination with one or more of the sixth or eighth aspects, the indication of the SNR mode to be used by the UE for the one or more downlink communications in the one or more slots comprises a specific field pattern of the DCI.

In a tenth aspect, alone or in combination with one or more of the first through ninth aspects, the indication of the SNR mode to be used by the UE for the one or more downlink communications in the one or more slots indicates the one or more slots.

In an eleventh aspect, alone or in combination with one or more of the first through tenth aspects, the indication of the SNR mode to be used by the UE for the one or more downlink communications in the one or more slots comprises an indication that the SNR mode is a higher SNR mode than an SNR mode that is active for the UE in the first slot.

In a twelfth aspect, alone or in combination with the eleventh aspect, the higher SNR mode is indicated based at least in part on downlink control information (DCI) including a slot offset parameter with a value greater than a threshold, the slot offset parameter indicates an amount of time between the DCI and a communication scheduled by the DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method of wireless communication performed by a user equipment (UE), comprising: receiving, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof; and operating using the SNR mode in the one or more slots based at least in part on the indication.

Aspect 2: The method of aspect 1, further comprising transmitting, to the base station, a UE capability report that includes an indication that the UE supports the SNR mode.

Aspect 3: The method of aspect 2, wherein the UE capability report indicates one or more additional SNR modes, of the plurality of SNR modes, that the UE supports.

Aspect 4: The method of either of aspects 2 or 3, wherein the UE capability report indicates a number of bits that the base station is to use to indicate the SNR mode.

Aspect 5: The method of any of aspects 1-4, further comprising receiving, from the base station, an indication of a mapping between a set of bit values, for one or more bits used to indicate the SNR mode, and at least one of: a corresponding set of SNR modes, a corresponding set of modulation and coding schemes, a corresponding set of ranks, a corresponding set of combinations of modulation and coding scheme and rank, or a combination thereof.

Aspect 6: The method of aspect 5, wherein the indication of the SNR mode to be used by the UE for the one or more downlink communications in the one or more slots comprises one or more bit values of the set of bit values.

Aspect 7: The method of any of aspects 1-6, wherein the indication of the SNR mode to be used by the UE for the one or more downlink communications in the one or more slots is included in downlink control information (DCI).

Aspect 8: The method of aspect 7, wherein the indication of the SNR mode to be used by the UE for the one or more downlink communications in the one or more slots is a single bit in the DCI that indicates a first SNR mode or a second SNR mode.

Aspect 9: The method of aspect 7, wherein the indication of the SNR mode to be used by the UE for the one or more downlink communications in the one or more slots includes multiple bits in the DCI that indicates the SNR mode from more than two SNR modes.

Aspect 10: The method of either of aspects 7 or 9, wherein the indication of the SNR mode to be used by the UE for the one or more downlink communications in the one or more slots comprises a specific field pattern of the DCI.

Aspect 11: The method of any of aspects 1-10, wherein the indication of the SNR mode to be used by the UE for the one or more downlink communications in the one or more slots indicates the one or more slots.

Aspect 12: The method of any of aspects 1-11, wherein the indication of the SNR mode to be used by the UE for the one or more downlink communications in the one or more slots comprises an indication that the SNR mode is a higher SNR mode than an SNR mode that is active for the UE in the first slot.

Aspect 13: The method of aspect 12, wherein the higher SNR mode is indicated based at least in part on downlink control information (DCI) including a slot offset parameter with a value greater than a threshold, wherein the slot offset parameter indicates an amount of time between the DCI and a communication scheduled by the DCI.

Aspect 14: A method of wireless communication performed by a base station, comprising: determining a modulation and coding scheme (MCS) and a rank to be used for one or more downlink communications in one or more slots; determining a signal to noise ratio (SNR) mode, of a plurality of SNR modes, to be indicated to a user equipment (UE) for the one or more downlink communications in the one or more slots based at least in part on at least one of the MCS, the rank, or a combination thereof; and transmitting, to the UE, an indication of the SNR mode.

Aspect 15: The method of aspect 14, further comprising receiving, from the UE, a UE capability report that includes an indication that the UE supports the SNR mode.

Aspect 16: The method of aspect 15, wherein the UE capability report indicates one or more additional SNR modes, of the plurality of SNR modes, that the UE supports.

Aspect 17: The method of either of aspects 15 or 16, wherein the UE capability report indicates a number of bits that the base station is to use to indicate the SNR mode.

Aspect 18: The method of any of aspects 14-17, further comprising transmitting, to the UE, an indication of a mapping between a set of bit values, for one or more bits used to indicate the SNR mode, and at least one of: a corresponding set of SNR modes, a corresponding set of modulation and coding schemes, a corresponding set of ranks, a corresponding set of combinations of modulation and coding scheme and rank, or a combination thereof.

Aspect 19: The method of aspect 18, wherein the indication of the SNR mode to be used by the UE for the one or more downlink communications in the one or more slots comprises one or more bit values of the set of bit values.

Aspect 20: The method of any of aspects 14-19, wherein the indication of the SNR mode to be used by the UE for the one or more downlink communications in the one or more slots is included in downlink control information (DCI).

Aspect 21: The method of aspect 20, wherein the indication of the SNR mode to be used by the UE for the one or more downlink communications in the one or more slots is a single bit in the DCI that indicates a first SNR mode or a second SNR mode.

Aspect 22: The method of aspect 20, wherein the indication of the SNR mode to be used by the UE for the one or more downlink communications in the one or more slots includes multiple bits in the DCI that indicates the SNR mode from more than two SNR modes.

Aspect 23: The method of either of aspects 20 or 22, wherein the indication of the SNR mode to be used by the UE for the one or more downlink communications in the one or more slots comprises a specific field pattern of the DCI.

Aspect 24: The method of any of aspects 14-23, wherein the indication of the SNR mode to be used by the UE for the one or more downlink communications in the one or more slots indicates the one or more slots.

Aspect 25: The method of any of aspects 14-24, wherein the indication of the SNR mode to be used by the UE for the one or more downlink communications in the one or more slots comprises an indication that the SNR mode is a higher SNR mode than an SNR mode that is active for the UE in the first slot.

Aspect 26: The method of aspect 25, wherein the higher SNR mode is indicated based at least in part on downlink control information (DCI) including a slot offset parameter with a value greater than a threshold, wherein the slot offset parameter indicates an amount of time between the DCI and a communication scheduled by the DCI.

Aspect 27: An apparatus for wireless communication at a device, comprising a processor; memory coupled with the processor; and instructions stored in the memory and executable by the processor to cause the apparatus to perform the method of one or more aspects of aspects 1-13.

Aspect 28: A device for wireless communication, comprising a memory and one or more processors coupled to the memory, the memory and the one or more processors configured to perform the method of one or more aspects of aspects 1-13.

Aspect 29: An apparatus for wireless communication, comprising at least one means for performing the method of one or more aspects of aspects 1-13.

Aspect 30: A non-transitory computer-readable medium storing code for wireless communication, the code comprising instructions executable by a processor to perform the method of one or more aspects of aspects 1-13.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 32: An apparatus for wireless communication at a device, comprising a processor; memory coupled with the processor; and instructions stored in the memory and executable by the processor to cause the apparatus to perform the method of one or more aspects of aspects 14-26.

Aspect 33: A device for wireless communication, comprising a memory and one or more processors coupled to the memory, the memory and the one or more processors configured to perform the method of one or more aspects of aspects 14-26.

Aspect 34: An apparatus for wireless communication, comprising at least one means for performing the method of one or more aspects of aspects 14-26.

Aspect 35: A non-transitory computer-readable medium storing code for wireless communication, the code comprising instructions executable by a processor to perform the method of one or more aspects of aspects 14-26.

Aspect 36: A non-transitory computer-readable medium storing a set of instructions for wireless communication, the set of instructions comprising one or more instructions that, when executed by one or more processors of a device, cause the device to perform the method of one or more aspects of aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors coupled to the memory, the one or more processors configured to cause the UE to:
  receive, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof, and wherein the indication of the SNR mode to be used by the UE for the one or more downlink communications in the one or more slots is included in downlink control information (DCI) of the first slot, and wherein the DCI includes a slot offset parameter that indicates an amount of time between the DCI of the first slot and the one or more downlink communications for which the SNR mode is to be used; and
  operate using the SNR mode in the one or more slots based at least in part on the indication.

2. The UE of claim 1, wherein the one or more processors are further configured to cause the UE to transmit, to the base station, a UE capability report that includes an indication that the UE supports the SNR mode.

3. The UE of claim 2, wherein the UE capability report indicates one or more additional SNR modes, of the plurality of SNR modes, that the UE supports.

4. The UE of claim 2, wherein the UE capability report indicates a number of bits that the base station is to use to indicate the SNR mode.

5. The UE of claim 1, wherein the one or more processors are further configured to cause the UE to receive, from the base station, an indication of a mapping between a set of bit values, for one or more bits used to indicate the SNR mode, and at least one of:
 a corresponding set of SNR modes,
 a corresponding set of modulation and coding schemes,
 a corresponding set of ranks,
 a corresponding set of combinations of modulation and coding scheme and rank, or a combination thereof.

6. The UE of claim 5, wherein the indication of the SNR mode to be used by the UE for the one or more downlink communications in the one or more slots comprises one or more bit values of the set of bit values.

7. The UE of claim 1, wherein the indication of the SNR mode to be used by the UE for the one or more downlink communications in the one or more slots is included in downlink control information (DCI).

8. The UE of claim 7, wherein the indication of the SNR mode to be used by the UE for the one or more downlink communications in the one or more slots is a single bit in the DCI that indicates a first SNR mode or a second SNR mode.

9. The UE of claim 7, wherein the indication of the SNR mode to be used by the UE for the one or more downlink communications in the one or more slots includes multiple bits in the DCI that indicates the SNR mode from more than two SNR modes.

10. The UE of claim 7, wherein the indication of the SNR mode to be used by the UE for the one or more downlink communications in the one or more slots comprises a specific field pattern of the DCI.

11. The UE of claim 1, wherein the indication of the SNR mode to be used by the UE for the one or more downlink communications in the one or more slots indicates the one or more slots.

12. The UE of claim 1, wherein the indication of the SNR mode to be used by the UE for the one or more downlink communications in the one or more slots comprises an indication that the SNR mode is a higher SNR mode than an SNR mode that is active for the UE in the first slot.

13. The UE of claim 12, wherein the higher SNR mode is indicated based at least in part on the slot offset parameter comprising a value greater than a threshold.

14. A base station for wireless communication, comprising:
 a memory; and
 one or more processors coupled to the memory, the one or more processors configured to cause the base station to:
  determine a modulation and coding scheme (MCS) and a rank to be used for one or more downlink communications in one or more slots;
  determine a signal to noise ratio (SNR) mode, of a plurality of SNR modes, to be indicated to a user equipment (UE) for the one or more downlink communications in the one or more slots based at least in part on at least one of the MCS, the rank, or a combination thereof; and
  transmit, to the UE, an indication of the SNR mode, wherein the SNR mode to be indicated to the UE for the one or more downlink communications in the one or more slots is included in downlink control information (DCI), and wherein the DCI includes a slot offset parameter that indicates an amount of time between the DCI and the one or more downlink communications for which the SNR mode is to be used.

15. The base station of claim 14, wherein the one or more processors are further configured to cause the base station to receive, from the UE, a UE capability report that includes an indication that the UE supports the SNR mode.

16. The base station of claim 15, wherein the UE capability report indicates one or more additional SNR modes, of the plurality of SNR modes, that the UE supports.

17. The base station of claim 15, wherein the UE capability report indicates a number of bits that the base station is to use to indicate the SNR mode.

18. The base station of claim 14, wherein the one or more processors are further configured to cause the base station to transmit, to the UE, an indication of a mapping between a set of bit values, for one or more bits used to indicate the SNR mode, and at least one of:
 a corresponding set of SNR modes,
 a corresponding set of modulation and coding schemes,
 a corresponding set of ranks, a corresponding set of combinations of modulation and coding scheme and rank, or a combination thereof.

19. The base station of claim 18, wherein the indication of the SNR mode to be used by the UE for the one or more downlink communications in the one or more slots comprises one or more bit values of the set of bit values.

20. The base station of claim 14, wherein the indication of the SNR mode to be used by the UE for the one or more downlink communications in the one or more slots is included in downlink control information (DCI).

21. The base station of claim 20, wherein the indication of the SNR mode to be used by the UE for the one or more downlink communications in the one or more slots is a single bit in the DCI that indicates a first SNR mode or a second SNR mode.

22. The base station of claim 20, wherein the indication of the SNR mode to be used by the UE for the one or more downlink communications in the one or more slots includes multiple bits in the DCI that indicates the SNR mode from more than two SNR modes.

23. The base station of claim 20, wherein the indication of the SNR mode to be used by the UE for the one or more downlink communications in the one or more slots comprises a specific field pattern of the DCI.

24. The base station of claim 14, wherein the indication of the SNR mode to be used by the UE for the one or more downlink communications in the one or more slots indicates the one or more slots.

25. The base station of claim 24, wherein the indication of the SNR mode to be used by the UE for the one or more downlink communications in the one or more slots comprises an indication that the SNR mode is a higher SNR mode than an SNR mode that is active for the UE in a first slot before the one or more slots.

26. The base station of claim 25, wherein the higher SNR mode is indicated based at least in part on the slot offset parameter comprising a value greater than a threshold.

27. A method of wireless communication performed by a user equipment (UE), the method comprising:
    receiving, from a base station and in a first slot, an indication of a signal to noise ratio (SNR) mode, of a plurality of SNR modes, to be used by the UE for one or more downlink communications in one or more slots that occur after the first slot, wherein different SNR modes of the plurality of SNR modes support at least one of different modulation and coding schemes, different ranks, or a combination thereof, and wherein the indication of the SNR mode to be used by the UE for the one or more downlink communications in the one or more slots is included in downlink control information (DCI) of the first slot, and wherein the DCI includes a slot offset parameter that indicates an amount of time between the DCI of the first slot and the one or more downlink communications for which the SNR mode is to be used; and
    operating using the SNR mode in the one or more slots based at least in part on the indication.

28. The method of claim 27, further comprising transmitting, to the base station, a UE capability report that includes an indication that the UE supports the SNR mode.

29. A method of wireless communication performed by a base station, the method comprising:
    determining a modulation and coding scheme (MCS) and a rank to be used for one or more downlink communications in one or more slots;
    determining a signal to noise ratio (SNR) mode, of a plurality of SNR modes, to be indicated to a user equipment (UE) for the one or more downlink communications in the one or more slots based at least in part on at least one of the MCS, the rank, or a combination thereof; and
    transmitting, to the UE, an indication of the SNR mode, wherein the SNR mode to be indicated to the UE for the one or more downlink communications in the one or more slots is included in downlink control information (DCI), and wherein the DCI includes a slot offset parameter that indicates an amount of time between the DCI and the one or more downlink communications for which the SNR mode is to be used.

30. The method of claim 29, further comprising receiving, from the UE, a UE capability report that includes an indication that the UE supports the SNR mode.

* * * * *